(12) United States Patent
Moriyama et al.

(10) Patent No.: US 7,710,846 B2
(45) Date of Patent: May 4, 2010

(54) PROTECTION MEMBER AND OPTICAL PICKUP DEVICE USING THE SAME

(75) Inventors: Junichi Moriyama, Ibaraki (JP); Kazuaki Mochida, Ibaraki (JP); Sunao Inoue, Fukaya (JP)

(73) Assignee: Nitto Denko Corporation, Osaka (JP)

( * ) Notice: Subject to any disclaimer, the term of this patent is extended or adjusted under 35 U.S.C. 154(b) by 490 days.

(21) Appl. No.: 11/730,167

(22) Filed: Mar. 29, 2007

(65) Prior Publication Data

US 2007/0230310 A1    Oct. 4, 2007

(30) Foreign Application Priority Data

Mar. 29, 2006    (JP)    .............................. 2006-092105

(51) Int. Cl.
*G11B 7/00*    (2006.01)
(52) U.S. Cl. .............................. 369/112.01; 369/112.23
(58) Field of Classification Search ........................ None
See application file for complete search history.

(56) References Cited

U.S. PATENT DOCUMENTS

2002/0054975 A1 *  5/2002  Hayashida et al. ......... 428/64.4
2003/0174634 A1    9/2003  Tanaka 2006/0078722 A1 *  4/2006  Noumi et al. ............ 428/304.4

FOREIGN PATENT DOCUMENTS

| JP | 2-54433 A | 2/1990 |
|---|---|---|
| JP | 5-144041 A | 6/1993 |
| JP | 8-31128 A | 2/1996 |
| JP | 11-312322 A | 11/1999 |
| JP | 2001-148175 A | 5/2001 |
| JP | 2001-297478 A | 10/2001 |
| JP | 2003-272206 A | 9/2003 |
| JP | 2004-234751 A | 8/2004 |
| JP | 2004-310943 A | 11/2004 |
| JP | 2006-53413 A | 2/2006 |

OTHER PUBLICATIONS

Ultrahigh-molecular-weight polyethylene porous film SUN MAP, XP-002454443, Feb. 18, 2005.
European Search Report dated Nov. 12, 2007.
Japanese Office Action dated Apr. 15, 2008.

* cited by examiner

*Primary Examiner*—Paul Huber
(74) *Attorney, Agent, or Firm*—Sughrue Mion, PLLC

(57) ABSTRACT

The present invention provides: a protection member used for preventing a contact between a lens for focusing light on an optical information recording medium and the optical information recording medium upon optically recording or reproducing information on or from the optical information recording medium, the protection member including an ultrahigh molecular weight polyethylene porous film; and an optical pickup device having the protection member.

8 Claims, 1 Drawing Sheet

PROTECTION MEMBER AND OPTICAL PICKUP DEVICE USING THE SAME

FIELD OF THE INVENTION

This invention relates to a protection member for preventing damages which can be caused by a contact between a lens for focusing light on an optical information recording medium and the optical information recording medium, as well as to an optical pickup device using the same.

BACKGROUND OF THE INVENTION

An optical pickup device for recording or reproducing information on or from an optical information recording medium such as DVD (Digital Versatile Disk) is provided with a lens for focusing light emitted from a light source on the optical information recording medium. This lens is opposed to the optical information recording medium in recording and reproduction and provided movably in a direction orthogonal to an information recording surface of the optical information recording medium and in a horizontal direction for the purposes of focus control and tracking control.

Recently, in order to realize high density recording, optical pickup devices using a laser beam of a short wavelength or a lens having a large number of apertures (NA) for recording and reproducing information have been proposed. The size of a recording mark of an optical information recording medium is proportional to the size of an optical spot, and it is possible to downsize the recording mark by downsizing the optical spot, thereby achieving improvement in recording density. When the laser beam wavelength is represented by $\lambda$, the optical spot size is decided by $\lambda/NA$. Namely, it is possible to improve the recording density of an optical pickup device by using the short wavelength laser beam and/or by using the lens having a large NA. For example, in the case of BD (Blu-ray Disk) developed as a large capacity optical information recording medium, it is possible to record information up to 27 GB on one side by using an optical pickup device using a blue-violet laser beam having a wavelength of 405 nm and an object lens having an NA of 0.85.

However, since a focal distance becomes shorter when the lens having large NA is used, a distance (hereinafter sometimes referred to as operation distance of lens) of the closest approach of the lens to a surface of the optical information recording medium is reduced. For instance, in one example of optical pickup device for BD, the focal distance is about 0.32 mm, and the lens operation distance is about 0.31 mm, which are remarkably short. As described above, due to the recent tendency of reducing the operation distance of the lens for the realization of high density recording, damages due to a contact between the lens and the optical information recording medium during operation of focus control and tracking control, for example, can easily be caused. Since the highest rotation speed of the optical information recording medium is about 150 km/h at its outer rim during recording and reproducing, at least one of the lens and the optical information recording medium is damaged when they contact with each other to make it impossible to record and reproduce information.

In order to solve the above problem, the optical pickup device has heretofore been provided with means for protecting the lens and the optical information recording medium from damages. For example, there has been proposed an optical pickup device provided with a protection member which is disposed on a surface opposed to an optical information recording medium of a component part retaining a lens, such as a lens barrel, and projected closer to the optical information recording medium than the lens is. As such protection member, a cushioning material made from a lamb felt (see Reference 1, for example), a projecting part made from a plastic which is more flexible than an optical information recording medium (see Reference 2, for example), a protector made from a silicon rubber (see Reference 3, for example), a protection lubrication film made from a non-crystalline carbon film and the like (see Reference 4, for example), a resin film produced by using a fluorine resin and the like as a base (see Reference 5, for example), and the like have been proposed.

[Reference 1] JP-5-144041
[Reference 2] JP-2-54433
[Reference 3] JP-11-312322
[Reference 4] JP-2001-297478
[Reference 5] JP-2003-272206

It is necessary for the protection member to reliably prevent the contact between the lens and the optical information recording medium as well as to avoid from damaging the information recording surface of the optical information recording medium when the protection member contacts the optical information recording medium. Therefore, the protection member is required to have an appropriate hardness for realizing a low friction property, a cushioning property (elasticity) for cushioning an impact of contact, and friction resistance.

However, as described in the foregoing, since recording and reproduction are performed in a state where the lens and the optical information recording medium are considerably close to each other in the case of the optical information recording medium of high recording density, an impact caused by a contact therebetween is great, and it has been difficult to protect both of the lens and the optical information recording medium with the use of conventional protection members.

SUMMARY OF THE INVENTION

Accordingly, an advantage of some aspects of this invention is to provide a protection member capable of more reliably preventing damages of a lens and an optical information recording medium in the case where the lens and the optical information recording medium are brought very close to each other for recording and reproduction. The present invention is mainly directed to the following items:

1. A protection member used for preventing a contact between a lens for focusing light on an optical information recording medium and the optical information recording medium upon optically recording or reproducing information on or from the optical information recording medium, the protection member comprising an ultrahigh molecular weight polyethylene porous film.

2. The protection member according to item 1, which further comprises a pressure-sensitive adhesive film laminated on the ultrahigh molecular weight polyethylene porous film.

3. The protection member according to item 2, which further comprises a permeation suppression film between the ultrahigh molecular weight polyethylene porous film and the pressure-sensitive adhesive film.

4. The protection member according to item 1, wherein a dynamic friction coefficient of the ultrahigh molecular weight polyethylene porous film is 0.3 or less.

5. The protection member according to item 1, wherein a compressive elastic modulus of the ultrahigh molecular weight polyethylene porous film is from 980 to 9,800 N/cm$^2$.

6. The protection member according to item 1, wherein a shore D hardness of the ultrahigh molecular weight polyethylene porous film is from 30 to 50.

7. The protection member according to item 1, wherein a thickness of the ultrahigh molecular weight polyethylene porous film is from 0.05 to 0.5 mm.

8. An optical pickup device used for optically recording or reproducing information on or from an optical information recording medium, the optical pickup device comprising: a lens for focusing light on the optical information recording medium; and a protection member according to any one of items 1 to 7, the protection member being disposed to project closer toward the optical information recording medium than the lens.

9. The optical pickup device according to item 8, wherein the ultrahigh molecular weight polyethylene porous film faces to the optical information recording medium.

In the protection member and the optical pickup device of this invention, "the ultrahigh molecular weight polyethylene" means polyethylene having a viscosity average molecular weight of 500,000 to 10,000,000, preferably 1,000,000 to 7,000,000.

A protection member of this invention includes an ultrahigh molecular weight polyethylene porous film. Since the ultrahigh molecular weight polyethylene porous film is obtained by increasing porosity of an ultrahigh molecular weight polyethylene having a low friction coefficient, the ultrahigh molecular weight polyethylene porous film exhibits a lower friction coefficient and excellent slidability. Further, the ultrahigh molecular weight polyethylene porous film has both of a high elasticity and a high hardness as well. By including the ultrahigh molecular weight polyethylene porous film having such characteristics, the protection member of this invention reliably prevents a contact between a lens and an optical information recording medium in the case where the lens and the optical information recording medium are brought very close to each other. Further, the protection member of this invention does not damage the optical information recording medium to a degree that makes information recording/reproduction impossible even when the protection member contacts the optical information recording medium. Thus, the protection member of this invention reliably prevents damages of the lens and the optical information recording medium when used in an optical pickup device for high recording density wherein the lens and the optical information recording medium are brought very close to each other.

Since an optical pickup device of this invention uses the protection member of this invention, the optical pickup device is capable of preventing the optical information recording medium from damage that makes information recording/reproduction impossible as well as of reliably preventing damage of a lens in the case of recording and reproducing information on and from the optical information recording medium of high density recording.

The protection member of this invention is suitably used for a large capacity optical information recording medium such as BD (Blu-ray Disk) to which the lens is disposed very close during recording and reproduction since the protection member effectively prevents damages of the lens and the optical information recording medium. Also, the optical pickup device of this invention is suitably used in the case where the optical information recording medium and the lens are disposed very close to each other during recording and reproduction for the same reason.

Figure 1:
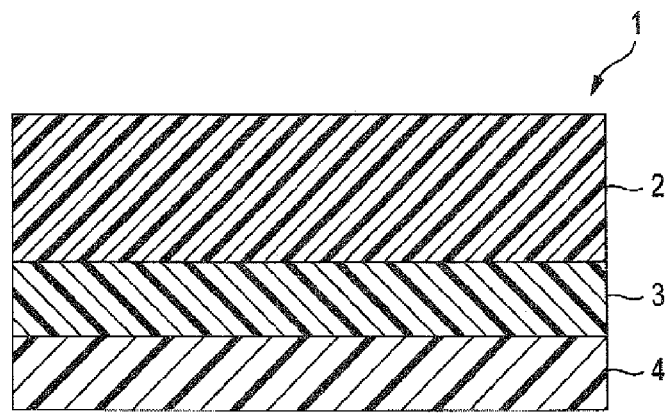
FIG. 1 is a sectional view showing one embodiment of protection member of this invention.

The reference numerals used in the drawings denote the followings, respectively.

1: protection member
2: ultrahigh molecular weight polyethylene porous film
3: permeation suppression film
4: pressure-sensitive adhesive film
11: lens
12: lens barrel
21: optical information recording medium

DETAILED DESCRIPTION OF THE INVENTION

Hereinafter, embodiments of this invention will be described with reference to drawings.

Figure 2:
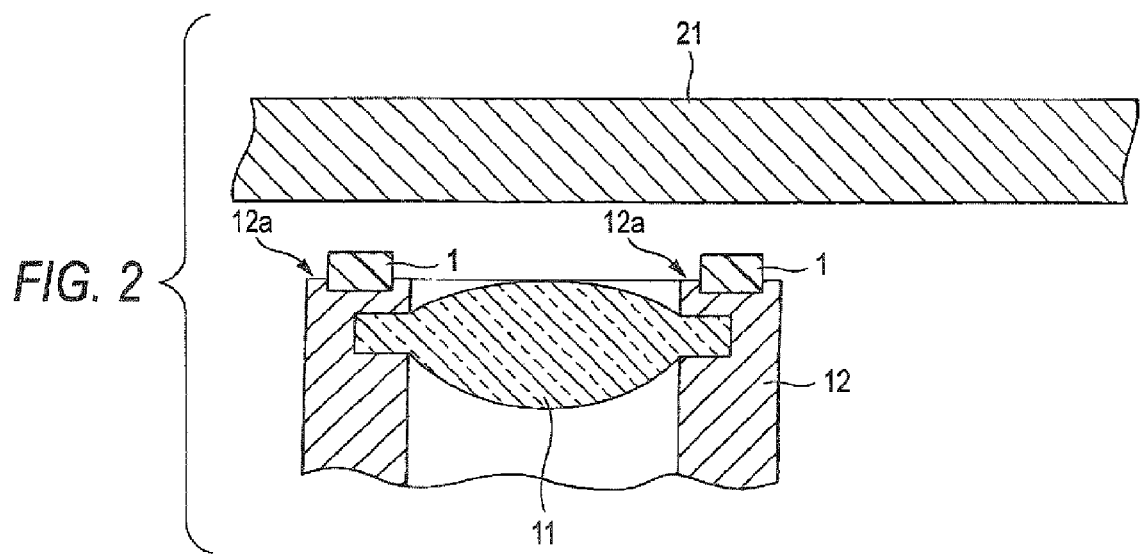
FIG. 2 is A sectional view schematically showing a lens part of an optical pickup device of this invention.

FIG. 1 is a sectional view showing one example of protection member of this invention. FIG. 2 is a sectional view schematically showing a lens part of an optical pickup device provided with the protection member shown in FIG. 1, wherein a state in which a lens is opposed to an optical information recording medium is depicted.

As shown in FIG. 2, an optical pickup device of this embodiment includes a lens 11 for focusing light on an optical information recording medium 21, lens barrels 12 retaining the lens 11, and protection members 1 joined to the lens barrels 12. Each of the protection members 1 is joined to a groove provided on a surface 12a, which is opposed to the optical information recording medium 21, of each of the lens barrels 12 and disposed in such a fashion that the protection member 1 is projected closer to the optical information recording medium 21 than the lens 11 is. More specifically, the protection member 1 is attached in such a fashion that the protection member 1 is closer to the optical information recoding medium than the closest approach of the lens 11 (a surface including a part which is closest to the optical information recording medium, the surface being parallel with a surface of the optical information recording medium) to the optical information recording medium is. By the protection members 1 disposed as described above, a contact between the lens 11 and the optical information recording medium 21 is suppressed.

The protection member 1 of this invention is formed by laminating an ultrahigh molecular weight polyethylene porous film 2, a permeation suppression film 3, and a pressure-sensitive adhesive film 4 in this order as shown in FIG. 1. One of surfaces of the ultrahigh molecular weight polyethylene porous film 2 is exposed to one of the surfaces of protection member 1, and the ultrahigh molecular weight polyethylene porous film 2 is opposed to the optical information recording medium during recording and reproduction. The protection member 1 is joined to the mirror barrel 12 (see FIG. 2) by the pressure-sensitive adhesive film 4. Though a three-layer protection member is described as one example of the protection member 1 in this embodiment, the protection member 1 is not limited thereto, and a single layer structure of the ultrahigh molecular weight porous film may be used or another layer may be included. In the case where the protection member is the single layer of the ultrahigh molecular weight polyethylene porous film, the protection member may be joined to the mirror barrel or the like with the use of an adhesive agent.

The ultrahigh molecular weight polyethylene porous film 2 is disposed in such a fashion as to be opposed to the optical information recording medium during recording and reproduction. The ultrahigh molecular weight polyethylene porous film 2 has a low friction property that does not damage an information recording surface of the optical information recording medium in the case of contact with the optical information recording medium, appropriate elasticity that sufficiently cushions an impact of the contact, and a hardness that realizes sufficient abrasion resistance. Therefore, according to the protection member 1 of this embodiment, it is possible to prevent both of the lens and the optical information recording medium from damages. Hereinafter, details of the ultrahigh molecular weight polyethylene porous film 2 will be described.

As the ultrahigh molecular weight polyethylene porous film 2, an ultrahigh molecular weight polyethylene porous film having a dynamic friction coefficient of 0.3 or less, preferably 0.18 or less, may be used in order to realize the low friction property. With the use of the ultrahigh molecular weight polyethylene porous film having the dynamic friction coefficient in the above-specified range, it is possible to more reliably prevent the optical information recording medium from being damaged even in the case where the optical information recording medium of which the highest rotation speed is 150 km/h at its outer rim contacts with the protection member 1. As used herein, the dynamic friction coefficient in the invention means a dynamic friction coefficient detected by using a polyethylene telephthalate (PET) as a counterpart material. More specifically, the dynamic friction coefficient was measured by: using a friction coefficient measurement device (Bowden-Leben type) and an iron ball having a diameter of 10 mm and covered with a PET film; setting a sliding velocity between the PET film stuck on the iron ball and the ultrahigh molecular weight polyethylene porous film to 150 mm/min.; and setting a back-and-forth distance to 50 mm.

As the ultrahigh molecular weight polyethylene porous film 2, an ultrahigh molecular weight polyethylene porous film having a compressive elastic modulus of 980 to 9,800 $N/cm^2$, preferably 1,960 to 3,920 $N/cm^2$, may be preferably used in order to realize the appropriate elasticity. With the use of the ultrahigh molecular weight polyethylene porous film having the compressive elastic modulus in the above-specified range, even in the case where the optical information recording medium of which the highest rotation speed is 150 km/h at its outer rim contacts with the protection member 1, it is possible to satisfactorily cushion an impact of the contact, thereby making it possible to more reliably prevent damages due to the contact between the lens and the optical information recording medium. As used herein, the compressive elastic modulus in the invention means a value measured by using a test piece obtained by laminating three sheets of an ultrahigh molecular weight polyethylene porous film having a thickness of 3 mm and employing a measurement method in accordance with JIS K 7181.

As the ultrahigh molecular weight polyethylene porous film 2, an ultrahigh molecular weight polyethylene porous film having a shore D hardness in the range of 30 to 50, preferably 30 to 52, more preferably in the range of 35 to 45, may be preferably used in order to realize the sufficient abrasion resistance. The shore D hardness is a hardness in accordance with JIS K 6253. Since it is possible to achieve the sufficient abrasion resistance by the hardness in the above-specified range, it is possible to prevent problems such as a contact between the lens and the optical information which can be caused by a deformation (reduction in height, for example) of the protection member 1 due to a contact with the optical information recording medium.

A thickness of the ultrahigh molecular weight polyethylene porous film 2 is not particularly limited since it may appropriately be set depending on a distance between the lens and the optical information recording medium, and, in view of the abrasion resistance and the like, the thickness may be selected from the range of 0.05 to 0.5 mm, preferably the range of 0.1 to 0.3 mm. Also, an average pore diameter of the ultrahigh molecular weight polyethylene porous film 2 is not particularly limited, and the average pore diameter may be selected from the range of 10 to 100 μm, preferably the range of 15 to 40 μm. It is possible to reduce the abrasion coefficient by setting the average pore diameter in the above-specified range.

Hereinafter, a production method of the ultrahigh molecular weight polyethylene porous film 2 will be described.

The ultrahigh molecular weight polyethylene porous film is produced by using ultrahigh molecular weight polyethylene as a raw material. Ultrahigh molecular weight polyethylene which is suitably used as the raw material has a viscosity average molecular weight of 500,000 to 10,000,000, preferably 1,000,000 to 7,000,000. As such ultrahigh molecular weight polyethylene, "HI-ZEX MILLION" (trade name: product of Mitsui Chemicals, Inc.), "HOSTALENE GUR" (trade name: product of Ticona), and the like are commercially available. It is possible to produce the ultrahigh molecular weight polyethylene porous film by sintering method, etc. It is possible to produce a porous matter by employing a known sintering method such as the method proposed by the inventors of this invention (Japanese Patent No. 2020026) and the like. More specifically, the ultrahigh molecular weight polyethylene porous film is produced by: filling a die with an ultrahigh molecular weight polyethylene powder; performing heating at a temperature lower than a melting point of the ultrahigh molecular weight polyethylene powder followed by pressurization to obtain a preliminary molded article; leaving the preliminary molded article in a reduced pressure atmosphere to eliminate air; and sintering the preliminary molded article in a water vapor atmosphere heated to a temperature higher than the melting point of the ultrahigh molecular weight polyethylene followed by cooling. Since only the sintering is performed without adding anything to the powdery raw material that hardly or never contains impurities in such sintering method, it is possible to obtain an original fabric sheet that does not contain impurities and is clean.

Hereinafter, the permeation suppression film 3 will be described. The permeation suppression film 3 is provided for the purpose of suppressing migration of an adhesive component of the pressure-sensitive adhesive film 4 to the ultrahigh molecular weight polyethylene porous film 2. With the provision of the permeation suppression film 3, it is possible to prevent permeation of the adhesive component of the pressure-sensitive adhesive film 4 into the surface of the protection member 1 (the surface opposed to the optical information recording medium) as well as an alternation in thickness of the ultrahigh molecular weight polyethylene porous film 2 due to deformation otherwise caused by invasion of the adhesive component into pores of the ultrahigh molecular weight polyethylene porous film 2. Also, in the case where it is difficult to attach the ultrahigh molecular weight polyethylene porous film 2 to the pressure-sensitive adhesive film 4, the permeation suppression film 3 makes it possible to attach the ultrahigh molecular weight polyethylene porous film 2 to the pressure-sensitive adhesive film 4. As the permeation suppression film 3, it is preferable to use the one capable of being joined to the ultrahigh molecular weight polyethylene porous film 2 without changing the porous structure. For example, in view of the cost and processability, a sheet made from a thermoplastic resin, such as a polyolefin-based film and a polyester-based film, is suitably used. With the use of the permeation film made from such material, it is possible to join the ultrahigh molecular weight polyethylene porous film 2 with the permeation suppression film 3 by melting a surface of the permeation suppression film 3 by heat lamination and partially impregnating the ultrahigh molecular weight polyethylene porous film 2 with the melted portion. Since it is possible to join the ultrahigh molecular weight polyethylene porous film 2 and the suppression film 3 without using an adhesive agent, it is possible to minimize a change in porous structure of the ultrahigh molecular weight polyethylene porous film 2 to be caused by the adhesive agent.

The pressure-sensitive adhesive film 4 is provided for the purpose of fixing the protection member 1 at a predetermined position (the lens barrel in this embodiment) of the optical pickup device. It is possible to use a double-sided adhesive tape as such pressure-sensitive adhesive film 4, for example.

Though the protection member 1 shown in FIG. 2 is joined to the surface 12a of the lens barrel 12 opposed to the optical information recording medium, the joining position is not particularly limited, and the protection member 1 may be joined to other positions (other component members) insofar as it is possible to dispose the protection member 1 in such a fashion that the protection member 1 is projected closer to the optical information recording medium 21 than the lens 11 is. Also, the shape of the protection member 1 is not particularly limited, and the protection member 1 may be in the form of a ring that encloses the lens 11 or in the form of a rectangle. The number of the protection members 1 to be provided is not particularly limited, and plural protection members may be disposed around the lens in the case where the rectangular protection member is used. Also, the lens provided in the optical pickup device for focusing light is not limited to the one shown in FIG. 2, and two lenses, for example, may be used.

EXAMPLES

The protection member of the present invention is now illustrated in greater detail with reference to Examples and Comparative Examples, but it should be understood that the present invention is not to be construed as being limited thereto.

Example 1

As a protection member of Example 1, the protection member having the three-layer structure as shown in FIG. 1 was prepared. As the ultrahigh molecular weight polyethylene porous film 2, "SUN MAP" (trade name; manufactured by Nitto Denko Corporation; dynamic friction coefficient: 0.08; compressive elastic modulus: 3,000 N/cm$^2$; shore D hardness: 46) having a thickness of 0.2 mm was used. "ADMER" (trade name; manufactured by Mitsui Chemicals, Inc.) having a thickness of 0.05 mm was heat-laminated on the ultrahigh molecular weight polyethylene porous film 2 as the permeation suppression film 3, and a double-sided adhesive tape (product of Nitto Denko Corporation; NO. 5606) having a thickness of 0.06 mm was adhered on the permeation suppression film 3, thereby obtaining an original fabric having a total thickness of 0.3 mm. A sample of the protection member having the size of a width of 0.75 mm and a length of 5 mm was obtained from this original fabric by punching. Two samples were prepared, and an optical pickup device capable of reading information from an optical information recording medium was used. The optical pickup device is provided with a lens retained by lens barrels shown in FIG. 2, and the two protection members were attached on surfaces of the lens barrels opposed to the optical information recording medium in such a fashion as to sandwich the lens. The optical information recording medium is rotated to achieve the highest rotation speed at its outer rim of 200 km/h, and the lens barrel provided with the protection member was brought into contact with an identical part of the rotating optical information recording medium for 500 times. After that, a degree of scratch on the optical information recording medium and absence/presence of scratch on the lens were evaluated by visual observation, and capability of information reading was confirmed by using the optical pickup device. Results of the evaluation of the protection member of Example 1 are shown in Table 1. In Table 1, the signs "o" and "x" of the Comprehensive Evaluation means that "the sample had sufficient properties for the invention" and "the sample did not have sufficient properties for the invention", respectively.

Example 2

As a protection member of Example 2, the protection member having the three-layer structure as shown in FIG. 1 was prepared. As the ultrahigh molecular weight polyethylene porous film 2, "SUN MAP" (trade name; manufactured by Nitto Denko Corporation; dynamic friction coefficient: 0.08; compressive elastic modulus: 3,000 N/cm$^2$; shore D hardness: 46) having a thickness of 0.1 mm was used. "ADMER" (trade name; manufactured by Mitsui Chemicals, Inc.) having a thickness of 0.05 mm was heat-laminated on the ultrahigh molecular weight polyethylene porous film 2 as the permeation suppression film 3, and a double-sided adhesive tape (product of Nitto Denko Corporation; NO. 5606) having a thickness of 0.06 mm was adhered on the permeation suppression film 3, thereby obtaining an original fabric having a total thickness of 0.2 mm. A sample of the protection member having the size same as that of Example 1 was obtained from this original fabric by punching. The protection member was evaluated in the same manner as in Example 1. Results of the evaluation are shown in Table 1.

Comparative Example 1

To a non-porous ultrahigh molecular weight polyethylene film having a thickness of 0.25 mm (product of Nitto Denko Corporation; No. 440; dynamic friction coefficient: 0.18; compressive elastic modulus: 12,000 N/cm$^2$; shore D hardness: 60), a double-sided adhesive tape (product of Nitto Denko Corporation; NO. 5606) having a thickness of 0.06 mm was adhered to obtain an original fabric having a total thickness of 0.31 mm. A comparative sample of the protection member having the size same as that of Example 1 was obtained from this original fabric by punching. The comparative sample was evaluated in the same manner as in Example 1. Results of the evaluation are shown in Table 1.

Comparative Example 2

To a fluorine resin sheet having a thickness of 0.25 mm (product of Nitto Denko Corporation; No. 900; dynamic friction coefficient: 0.11; compressive elastic modulus: 15,000 N/cm$^2$; shore D hardness: 55), a double-sided adhesive tape (product of Nitto Denko Corporation; NO. 5606) having a thickness of 0.06 mm was adhered to obtain an original fabric having a total thickness of 0.31 mm. A comparative sample of the protection member having the size same as that of Example 1 was obtained from this original fabric by punching. The comparative sample was evaluated in the same manner as in Example 1. Results of the evaluation are shown in Table 1.

TABLE 1

| | Degree of Scratch on Optical Information Recording Medium | Absence/ Presence of Scratch on Lens | Capability of Information Reading | Comprehensive Evaluation |
|---|---|---|---|---|
| Ex. 1 | Very small | Absent | Capable | o |
| Ex. 2 | Very small | Absent | Capable | o |
| Comp. Ex. 1 | Large | Absent | Incapable | x |
| Comp. Ex. 2 | Small | Present | Incapable | x |

As shown in Table 1, in Examples 1 and 2 in each of which the ultrahigh molecular weight polyethylene porous film was used for the surface opposed to the optical information recording medium, it was possible to read information though a shallow scratch was observed on the surface of the optical information recording medium (degree of scratch: very small). Also, no scratch was observed on the lens. Though the sample of Example 2 was smaller in thickness than other samples, the sample satisfactorily protected the optical information recording medium and the lens.

In contrast, the sample of Comparative Example 1 caused a large scratch on the surface of the optical information recording medium to make it impossible to read information from the optical information recording medium, though it did not cause any scratch on the lens. It is considered that the scratch was caused because the ultrahigh molecular weight polyethylene film was inferior in slidability due to the larger dynamic friction coefficient as compared to the ultrahigh molecular weight polyethylene porous film. The sample of Comparative Example 2 using the fluorine resin-based material caused a scratch on the lens to make it impossible to read information though the scratch on the optical information recording medium was small. It is considered that the scratch on the lens was caused by thickness deformation of the protection member due to impact and abrasion by the contact since the fluorine resin-based material is inferior in elasticity and hardness as compared to the ultrahigh molecular weight polyethylene porous film.

In view of the above evaluation results, it was confirmed that the protection member prepared by using the ultrahigh molecular weight polyethylene porous film is capable of reliably protecting the optical information recording medium and the lens since the protection member has the low friction property, the elasticity, and the hardness that achieve satisfactory protection of both of the optical information recording medium and the lens.

While the present invention has been described in detail and with reference to specific embodiments thereof, it will be apparent to one skilled in the art that various changes and modifications can be made therein without departing from the spirit and scope thereof.

The present application is based on Japanese Patent Application No. 2006-092105 filed on Mar. 29, 2006, and the contents thereof are incorporated herein by reference.

What is claimed is:

1. A protection member used for preventing a contact between a lens for focusing light on an optical information recording medium and the optical information recording medium upon optically recording or reproducing information on or from the optical information recording medium, the protection member comprising an ultrahigh molecular weight polyethylene porous film,
    wherein a dynamic friction coefficient of the ultrahigh molecular weight polyethylene porous film is 0.3 or less.

2. The protection member according to claim 1, which further comprises a pressure-sensitive adhesive film laminated on the ultrahigh molecular weight polyethylene porous film.

3. The protection member according to claim 2, which further comprises a permeation suppression film between the ultrahigh molecular weight polyethylene porous film and the pressure-sensitive adhesive film.

4. The protection member according to claim 1, wherein a compressive elastic modulus of the ultrahigh molecular weight polyethylene porous film is from 980 to 9,800 N/cm$^2$.

5. The protection member according to claim 1, wherein a shore D hardness of the ultrahigh molecular weight polyethylene porous film is from 30 to 50.

6. The protection member according to claim 1, wherein a thickness of the ultrahigh molecular weight polyethylene porous film is from 0.05 to 0.5 mm.

7. An optical pickup device used for optically recording or reproducing information on or from an optical information recording medium, the optical pickup device comprising:
    a lens for focusing light on the optical information recording medium; and
    a protection member according to any one of claims 1 to 3 and 5 to 6, the protection member being disposed to project closer toward the optical information recording medium than the lens.

8. The optical pickup device according to claim 7, wherein the ultrahigh molecular weight polyethylene porous film faces to the optical information recording medium.

* * * * *